United States Patent
Kondo et al.

(10) Patent No.: US 6,404,786 B1
(45) Date of Patent: Jun. 11, 2002

(54) LASER BEAM GENERATING APPARATUS

(75) Inventors: Kenji Kondo, Saitama; Michio Oka, Tokyo; Hiroyuki Wada, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/543,136

(22) Filed: Apr. 5, 2000

Related U.S. Application Data (63) Continuation-in-part of application No. 09/136,072, filed on Aug. 18, 1998, now abandoned.

(30) Foreign Application Priority Data

Aug. 25, 1997 (JP) .............................................. 9-228107
Sep. 9, 1997 (JP) .............................................. 9-243739

(51) Int. Cl.⁷ .............................. H01S 3/10; H01S 3/08
(52) U.S. Cl. .............................. 372/22; 372/21; 372/92; 372/95; 372/98; 372/101
(58) Field of Search .............................. 372/22, 98, 99, 372/103, 92, 21, 95, 101

(56) References Cited

U.S. PATENT DOCUMENTS

| | | | |
|---|---|---|---|
| 5,270,643 A | * 12/1993 | Richardson et al. | .... 324/158 R |
| 5,585,962 A | * 12/1996 | Dixon | ......................... 359/328 |
| 5,621,744 A | *  4/1997 | Kikuchi et al. | ................ 372/12 |
| 5,982,805 A | * 11/1999 | Kaneda | ......................... 372/98 |

FOREIGN PATENT DOCUMENTS

| | | | |
|---|---|---|---|
| JP | 60-576695 | 4/1985 | ............. H01S/3/18 |
| JP | 4-84481 | 3/1992 | ............. H01S/3/18 |
| JP | 5-110174 | 4/1993 | ........... H01S/0/094 |

OTHER PUBLICATIONS

Oka et al, "All–Solid–State Continuous Wave 0.1–W Ultraviolet Laser," Conference on Lasers and Electro–Optics, vol. 12, Paper CWQ7, 1992, pp. 374–375.

M. Oka & S. Kubota, "Second–Harmonic Generation Green Laser for Higher–Density Optical Disks," Japanese Journal of Applied Physics, vol. 31, No. 2, Feb. 1992, pp. 513518.

* cited by examiner

*Primary Examiner*—Paul Ip
*Assistant Examiner*—Armando Rodriguez
(74) *Attorney, Agent, or Firm*—Oblon, Spivak, McClelland, Maier & Neustadt, P.C.

(57) ABSTRACT

A laser beam in the ultraviolet region is generated at high power for along period. A green laser beam generated by a laser oscillator comes incident into a resonator from behind a first curved mirror, and circulates there, reflected by each mirror. By passing a barium borate crystal, it causes a secondary harmonic (a laser beam in the ultraviolet region) to be generated, which is taken out of the resonator via a second curved mirror. The beam waist of the laser beam passing the barium borate crystal is set to 46 μm, about double the conventional thickness, by adjusting the distance between the first curved mirror and a second flat mirror. As a result, the power density of the laser beam in the barium borate crystal is reduced to ¼ of the value according to the related art, and it is made possible to avoid rapid degradation of the barium borate crystal by excessive squeezing of the laser beam.

4 Claims, 8 Drawing Sheets

LASER BEAM GENERATING APPARATUS

PRIORITY

This application is a continuation-in-part application claiming the benefit of priority to U.S. patent application Ser. No. 09/136,072, filed on Aug. 18, 1998 abandoned.

BACKGROUND OF THE INVENTION

1. Field of the Invention

The present invention relates to a laser beam generating apparatus, and more particularly to a laser beam generating apparatus wherein a resonator, provided outside of a laser oscillator, contains a barium borate crystal and a laser beam in the ultraviolet region is supplied, with harmonic content extracted from the laser beam generated by the laser oscillator. In further detail, the invention relates to an optical system for irradiating optical components with an ultraviolet beam of not more than 400 nm in wavelength or a laser beam generating apparatus for generating an ultraviolet beam of not more than 400 nm in wavelength.

2. Description of the Related Art

If, in the field of semiconductor manufacturing for example, a laser beam in the ultraviolet region can be used in a stepper (a sequentially shifting exposure system), finer processing than what is currently done will be made possible, enabling large-capacity memory elements which are further enhanced in the level of integration to be manufactured. A laser beam in the ultraviolet region can be applied not only for this purpose but also to photochemical reactions and biotechnology, and therefore practical availability of ultraviolet lasers in many different fields is awaited.

By a method according to the related art with high potential for practical application to generate a laser beam in the ultraviolet region, a barium borate crystal, which is a nonlinear optical crystal, is disposed in a resonator provided outside the laser oscillator, and secondary harmonic content is extracted from the laser beam generator by the laser oscillator.

Where a laser beam in the ultraviolet region is to be generated by this method, a harmonic content of the required intensity, i.e. an ultraviolet laser beam, is obtained by squeezing the waist of the laser beam (i.e. the radius of the cross section of the beam) which is allowed to pass the barium borate crystal, because the nonlinear conversion coefficient of the barium borate crystal is generally small.

However, the squeezing of the waist of the laser beam results in a greater power density of the laser beam in the barium borate crystal, leading to the problem that they may be heavily damaged both on the surface and inside.

Therefore, such a laser beam generating apparatus according to the related art, although an ultraviolet laser beam is obtained in a high output during the early phase of its use, steeply drops in output with the lapse of time, making it difficult for a high output to be maintained for a long period.

Incidentally, by the conventional method, if the power of an ultraviolet laser beam is 100 mW, the output can last for not more than 400 hours, and the velocity of degradation (the velocity of power drop) is about $1.35 \times 10^{-4}$ [%/hour].

Figure 1:
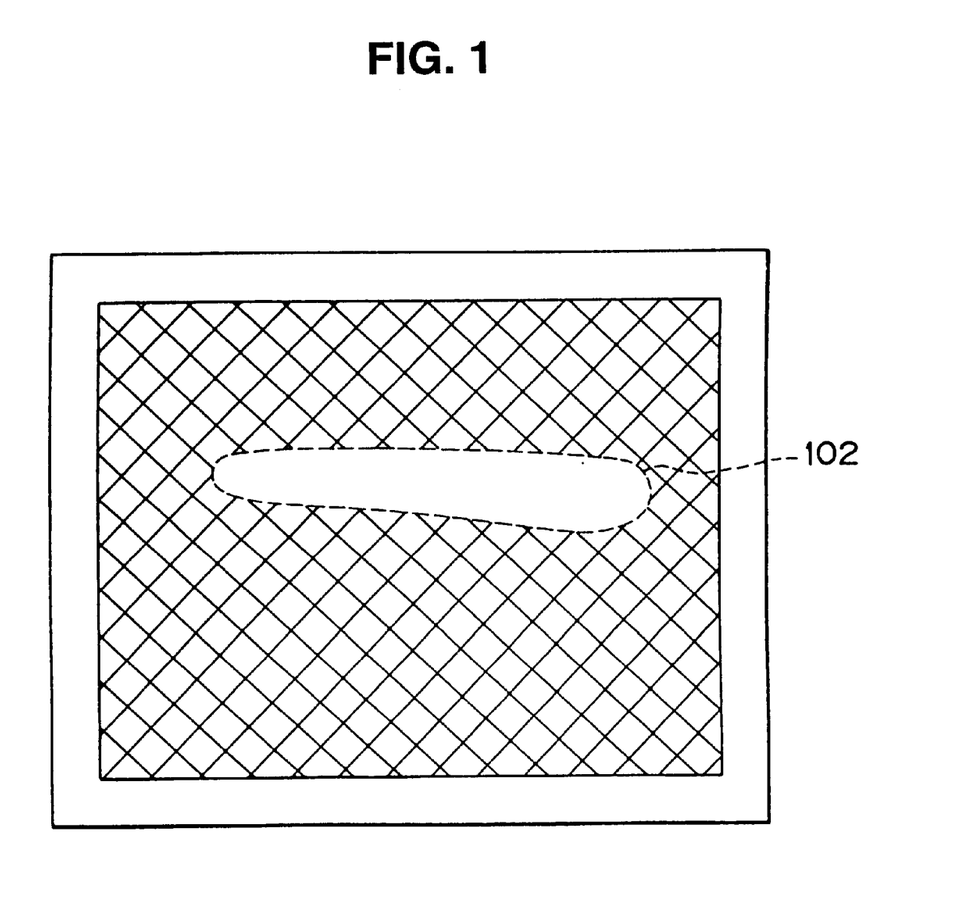
FIG. 1 is a schematic diagram showing the result of microscopic observation of the trace of a beam pattern formed in a barium borate crystal where the beam waist is 23 $\mu$m.

The damage to the barium borate crystal can be more clearly observed by microscope. FIG.

FIG. 1 is a schematic diagram showing the result of microscopic observation of the trace of a beam pattern formed in a barium borate crystal where the beam waist is 23 μm.

This diagram is a front view of the laser beam emitting end face of the barium borate crystal, in which the area surrounded by a dotted line 102 is the part damaged by the laser beam, looking more turbid than the surrounding normal part. Incidentally, it is because the generated harmonic content spreads at an angle of about 4° to the original laser beam that the damage is oblong laterally.

Furthermore, there is another problem that optical components deteriorate in performance characteristics when irradiated in the atmosphere with an ultraviolet ray of not more than 400 nm in wavelength, presumably because the optical losses of the optical components increase in such a situation. Such optical losses are presumed to occur as moisture and oily contents in the atmosphere on the surface of the optical components react and the reaction products and particles around them stick to the surface of the optical components.

When an ultraviolet beam of not more than 400 nm in wavelength is to be generated, in wavelength conversion using an external resonator (for information on which, see M. Oka and S. Kubota, Jpn. J. Appl. Phys. Vol. 31 (1992), pp. 513, and M. Oka et. al., in the Digest of Conference on Laser and Electro-Optics (OSA, Washington, D.C., 1992), paper CWQ7) or the like, the harmonic output is significantly reduced by intricate performance deterioration of a mirror or a nonlinear optical element arranged within the external resonator. This deterioration again, as the present inventor sees it, seems attributable to similar circumstances to what was described above. When, for instance, an ultraviolet beam of not more than 400 nm in wavelength formed by wavelength conversion passes an optical component, such as a mirror, it adversely affects the performance of the optical component (e.g. the mirror).

Therefore, for use where optical components are to be irradiated with an ultraviolet beam of not more than 400 nm in wavelength as well as where an ultraviolet beam of not more than 400 nm is to be generated, there is a keen call for the development of an optical system which can prevent the optical performance of optical components from being adversely affected by an increase in optical losses or their output performance and other attributes from being deteriorated.

Problems with the aforementioned related art will be described below with reference to drawings. For instance, where a dominant wave of 532 nm in wavelength is to be converted in wavelength into an ultraviolet beam of 266 nm in wavelength by using an external resonator, the structure of the external resonator—art will be as illustrated in FIG. 2.

Figure 2:
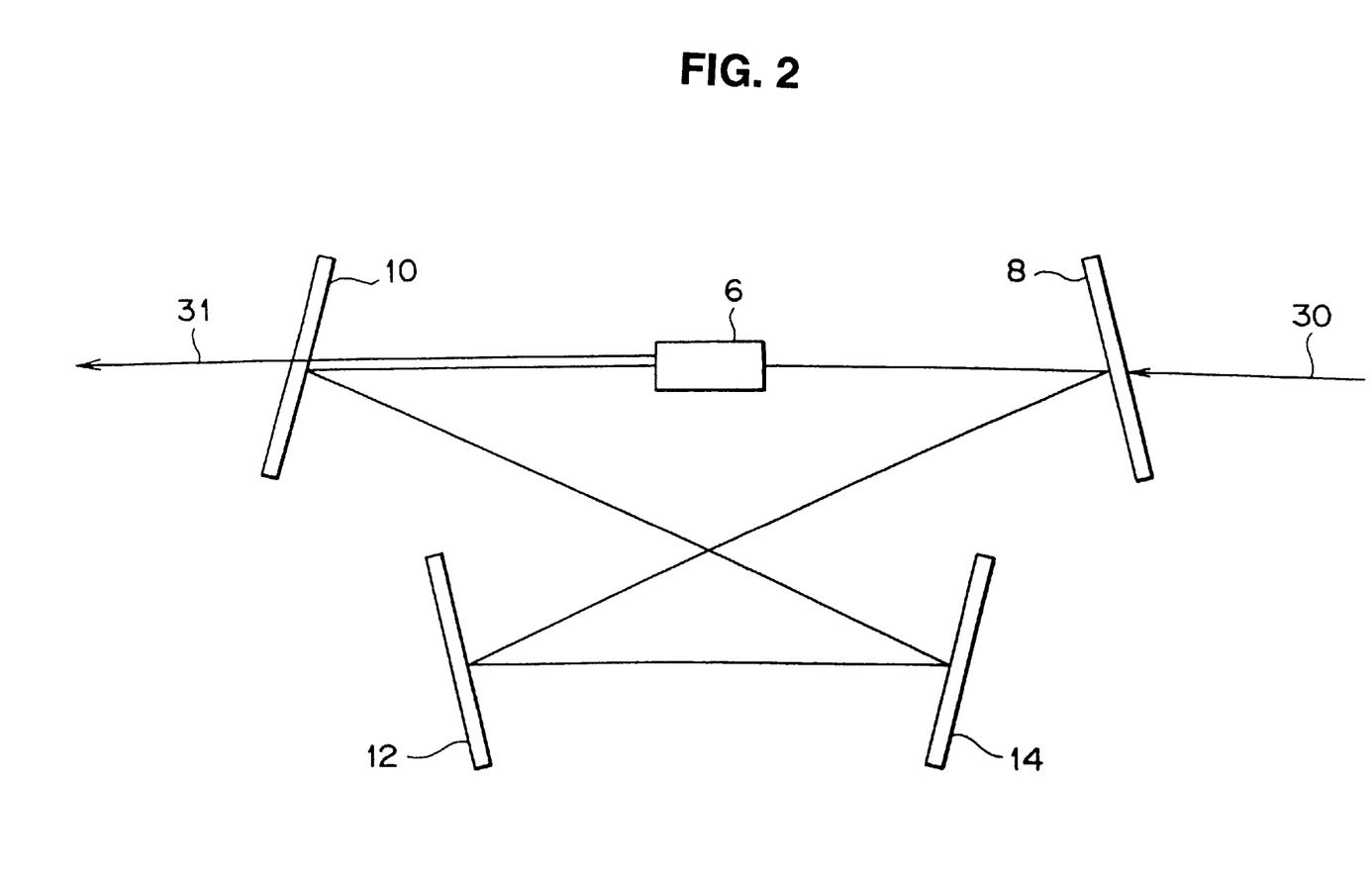
FIG. 2 illustrates the configuration of an external resonator for use in wavelength: conversion to an ultraviolet beam of not more than 400 nm in wavelength.

In FIG. 2, what are denoted by reference numerals 10, 12 and 14 are highly reflective mirrors having an ultra-high reflectance at a wave-Length of 532 nm, e.g. a reflectance of 99. 95% or more; what is denoted by numeral 8 is an incidence mirror having a high reflectance, e.g. a reflectance of 99% at a, wavelength of 532 nm; and what is denoted by numeral 6 is a nonlinear optical crystal BBO, which is a wavelength converting element coated with a less reflective film having a low reflectance, e.g. a reflectance of not more than 0.1% at a wavelength of 532 nm., The highly reflective mirror 14 is installed over a VCM (see the above-cited SRF92 collection of preliminary papers), which is a positioning device (not shown), and can be controlled by, for instance, a servo drive system. The elements 6, B, 10, 12 and 24 referred to above constitute an external resonator section.

When a dominant Wave (of 532 nm in wavelength here) schematically indicated by an arrow 30 in FIG. 2 is brought to incidence on this external resonator, it is amplified between the mirrors, and the amplified dominant wave is converted by the nonlinear optical crystal 6 (BBO) into a secondary harmonic (of 266 nm in wavelength here). This secondary harmonic is schematically indicated by an arrow 31 in FIG. 2.

When such a wavelength conversion as described above is accomplished in the atmosphere, optical losses (to be specific, mainly scattering) of the mirrors (especially the mirror 10) increase. The relationship between an optical loss and the power of the dominant wave of 532 nm in wavelength, amplified in the external resonator, can be represented by the following equation.

$$P\omega = \sqrt{(\delta cav^2 + 4\gamma_{SH} Pi - \delta cav)2\gamma_{SH}} \quad \text{Equation 1}$$

Where $\delta cav$ is the optical loss at a wavelength of 532=in the external resonator; $P\omega$, the power of the amplified dominant wave; $Pi$, the power of the dominant wave of 532 nm in wavelength coming incident on the external resonator; and $\gamma_{SH}$, a constant known as a nonlinear conversion factor determined by the crystalline length of the nonlinear optical crystal 6 (BBO), wavelength of the dominant wave, spot size and focusing parameter.

Equation 1 given above reveals that, in the external resonator, the power $P\omega$ of the dominant wave decreases with an increase in the optical loss $\delta cav$.

On the other hand, the relationship between the power of the dominant wave and that of the secondary harmonic can be represented by Equation 2 below.

$$P_2\omega = \gamma_{SH} P\omega^2 \quad \text{Equation 2}$$

Where $P\omega$ is the power of the dominant wave coming incident on the nonlinear optical crystal 6 (BBO); $P_2\omega$ the power of the secondary harmonic generated by wavelength conversion by the nonlinear optical crystal 6 (BBO); and $\gamma_{SH}$, said nonlinear conversion factor.

Equation 2 given above reveals that, when the power $P\omega$ of the dominant wave decreases, the power $P_2\omega$ of the secondary harmonic also decreases. In a rough measure, the power of the secondary harmonic halves in about 5 to 10 hours.

SUMMARY OF THE INVENTION

An object of the present invention is to provide a laser beam generating apparatus capable of generating a laser beam in the ultraviolet region at a high power level for a long period of time.

In order to achieve the above-stated object, according to the invention, there is provided a laser beam generating apparatus comprising a laser oscillator; an external resonator on which a laser beam emitted from said laser oscillator comes incident; and a barium borate crystal disposed on an optical path within said external resonator, whereby a harmonic content is extracted from said laser beam emitted from said laser oscillator to supply a laser beam in the ultraviolet region, having a configuration in which the length of said barium borate crystal along said optical path is within the range of 2 mm to 6 mm and the beam waist of said laser beam passing said barium borate crystal in the position of said barium borate crystal is within the range of 40 $\mu$m to 60 $\mu$m.

According to the invention, there is also provided a laser beam generating apparatus comprising a laser oscillator; an external resonator on which a laser beam emitted from said laser oscillator comes incident; and a barium borate crystal disposed on an optical path within said external resonator, whereby a harmonic content is extracted from said laser beam emitted from said laser oscillator to supply a laser beam in the ultraviolet region, having a configuration in which the length of said barium borate crystal along said optical path is greater than 6 mm and the beam waist of said laser beam passing said barium borate crystal in the position of said barium borate crystal is greater than 60 $\mu$m.

A laser beam generating apparatus according to the invention, having a configuration in which the length of the barium borate crystal along the optical path is within the range of 2 mm to 6 mm and the beam waist of said laser beam passing said barium borate crystal is within the range of 40 $\mu$m to 60 $\mu$m, and the power density of the laser beam in the barium borate crystal is thereby prevented from becoming greater than necessary, is increased in the service life of the barium borate crystal and enabled to generate an ultraviolet laser beam for a long period of time at a high output.

Further, a laser beam generating apparatus according to the invention, having a configuration in which the length of the barium borate crystal along the optical path is greater than 6 mm and the beam waist of the laser beam passing the barium borate crystal is greater than 60 $\mu$m, and the power density of the laser beam in the barium borate crystal is thereby prevented from becoming greater than necessary, is increased in the service life of the barium borate crystal and enabled to generate an ultraviolet laser beam for a long period of time at a high output.

In order to achieve the above-stated object, in an optical system irradiated with an ultraviolet beam according to the invention, optical components are irradiated with an ultraviolet beam of not more than 400 nm in wavelength, and 99.9% or more of the ambience of the optical components is nitrogen.

In another such optical system, 99.9% or more of the ambience of the optical components is air.

In still another such optical system, the ambience of the optical components is a gas whose moisture content is not more than 0.1%.

In yet another such optical system, the ambience of the optical components is a gas whose hydrocarbon compound content is not more than 0.1%.

In order to achieve the above-stated object, in a laser beam generating apparatus according to the invention, where an ultraviolet beam of not more than 400 nm in wavelength is to be generated by wavelength conversion with a nonlinear optical crystal disposed in an external resonator, 99.9% or more of the ambiance of its mirror section and nonlinear optical crystal section is nitrogen.

In another such laser beam generating apparatus, 99.9% or more of the ambiance of its mirror section and nonlinear optical crystal section is air.

In still another such laser beam generating apparatus, the ambiance of its mirror section and nonlinear optical crystal section is a gas whose moisture content is not more than 0.1%.

In yet another such laser beam generating apparatus, the ambiance of its mirror section and nonlinear optical crystal section is a gas whose hydrocarbon compound content is not more than 0.1%.

In another such laser beam generating apparatus, the ambiance of its mirror section and nonlinear optical crystal section is a gas whose moisture content and hydrocarbon compound content is not more than 0.1%. At the same time, 1% or more of the ambiance of its mirror section and nonlinear optical crystal is oxygen. The above-mentioned value of ratios is based on volume percentage.

The present invention is a result of various studies taking note of the ambiance in which irradiation with an ultraviolet beam of not more than 400 nm in wavelength is done, or such an ultraviolet beam is generated, an aspect which had not been considered previously, especially with respect to the purity of nitrogen or air or the proportion of the moisture or oily (hydrocarbon compound) content. According to the invention, an ultraviolet beam of not more than 400 nm in wavelength can give a satisfactory result for the object of the invention as long as the purity of nitrogen or air or the proportion of the moisture or oily (hydrocarbon compound) content is within the applicable range envisaged according to the invention.

Incidentally, although the Gazette of the Japanese Patent Laid-open No. Sho 60-57695 discloses a technique to seal in a laser element airtightly and thereby prevent its deterioration, that of the Japanese Patent Laid-open No. Hei 4-84481 discloses a technique to protect a laser element by enclosing inert gas in the package of a semiconductor laser apparatus, and that of the Japanese Patent Laid-open No. Hei 5-110174 discloses a technique to use inert gas as the ambiance of a laser diode, but none of these disclosures concerns a configuration similar to the present invention.

DESCRIPTION OF THE PREFERRED EMBODIMENTS

Next, preferred embodiments of the present invention will be described with reference to drawings.

Figure 3:
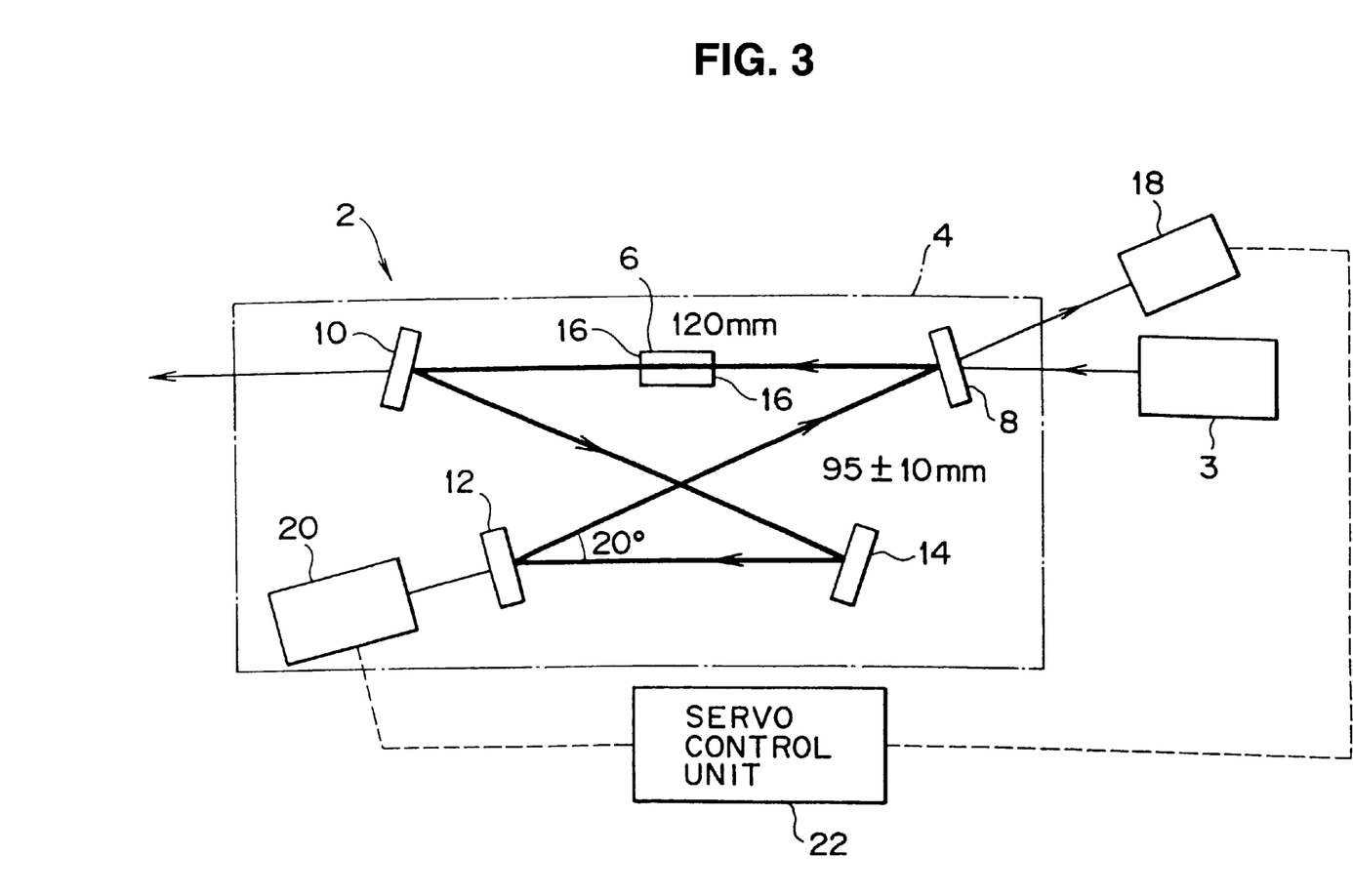
FIG. 3 illustrates the configuration of an essential part of a laser beam generating apparatus according to the present invention.

FIG. 3 illustrates the configuration of an essential part of a laser beam generating apparatus according to the present invention.

As illustrated, a laser beam generating apparatus 2, which is a preferred embodiment of the invention, comprises a laser oscillator 3, a resonator on which a laser beam generated by the laser oscillator 3 comes incident, and a barium borate crystal 6 disposed on an optical path within the resonator 4.

The resonator 4 further comprises first and second curved mirrors 8 and 10 disposed at an interval between and substantially opposite to each other, and first and second flat mirrors 12 and 14 disposed at an interval between and substantially opposite to each other.

Each of the mirrors is arranged at one or another of the apexes of an inverted trapezoid symmetric with respect to a vertical centerline, with the first and second curved mirrors 8 and 10 positioned at the two ends of the longer of the two parallel sides of said trapezoid, and the first and second flat mirrors 12 and 14, positioned at the two ends of the shorter of the two parallel sides of said trapezoid.

The first curved mirror 8 and the second flat mirror 14 are disposed adjacent to each other, and the second curved mirror 10 and the first flat mirror 12 adjoin each other.

The distance between the first and second curved mirrors 8 and 10 is about 120 mm, and that between the first curved mirror 8 and the first flat mirror 12 is 95±10 mm, both in this particular embodiment.

Each mirror is disposed with, an appropriate inclination with the result that the laser beam reflected by the first curved mirror 8 comes incident on the second curved mirror 10, the laser beam reflected by the second curved mirror 10 comes incident on the second flat mirror 14, the laser beam reflected by the second flat mirror 14 comes incident on the first flat mirror 12, and the laser beam reflected by the first flat mirror 12 comes incident on the first curved mirror 8.

The angle formed by the laser beam coming incident on the first flat mirror 12 and that reflected by the first flat mirror 12 is approximately 20° in this particular embodiment.

In this embodiment, every one of the second curved mirror 10, and the first and second flat mirrors 12 and 14 has a reflectance of no less than 99.9%, and the first curved mirror 8 has a reflectance of 99%.

The barium borate crystal (BBO) 6 as a nonlinear optical crystal is arranged between the first and second curved mirrors 8 and 10. The laser beam emitted from the first curve mirror 8 comes incident on the second curved mirror 10 via this barium borate crystal 6. The length of the barium borate crystal 6 along the optical path is 6 mm in this particular embodiment.

On two end faces 16 of the barium borate crystal 6 respectively facing the first and second curved mirrors 8 and 10 have anti-reflection (AR) coats, so that the laser beam coming incident on the barium borate crystal 6 and that emitted from the barium borate crystal 6 pass these end faces 16 virtually without being reflected. The residual reflectance is 0.03% in this particular embodiment.

The laser oscillator 3 generates a green laser beam of 532 nm in wavelength in this particular embodiment. The laser beam generated by the laser oscillator 3 travels along, a straight line linking the first and second curved mirrors 8 and 10, and comes incident into the resonator 4 from behind the first curved mirror 8.

Near the rear side of the first curved mirror 8 is disposed a photodetector 18, which can receive the laser beam emitted from the laser oscillator 3 and coming incident on and reflected by the first curved mirror 8.

The first flat mirror 12 is fitted to a voice coil motor 20 and, by driving the first flat mirror 12 with this voice coil motor 20, the distance between the first curved mirror 8 and the first flat mirror 12 can be adjusted in an order of a few nm.

A servo control unit 22 constantly monitors the result of detection by this photodetector 18, and controls the voice coil motor 20 so as to minimize the laser beam intensity detected by the photodetector 20, so that the green laser beam from the laser oscillator 3 can efficiently come incident into the resonator 4.

The basic operation of this laser beam generating apparatus proceeds as described below.

The green laser beam generated by the laser oscillator 3 comes incident into the resonator 4 from behind the first curved mirror 8.

Then, the laser beam reflected toward the rear side of the first curved mirror 8 is detected by the photodetector 18.

The servo control unit 22, as stated above, is constantly monitoring the result of detection by the photodetector 18, and controls the voice coil motor 20 so as to minimize the laser beam intensity detected by the photodetector 20.

This enables the green laser beam from the laser oscillator 3 to efficiently come incident into the resonator 4 and eventually a high power ultraviolet laser beam to be provided.

The laser beam coming incident into the resonator 4 travels straight ahead, passes the barium borate crystal 6, and comes incident on the second curved mirror 10.

The laser beam coming incident on the second curved mirror 10 is reflected by the second curved mirror 10 to come incident on the second flat mirror 14.

The laser beam coming incident on the second flat mirror 14 is reflected by the second flat mirror 14 to travel toward the first flat mirror 12, comes incident on the first flat mirror 12, and is reflected by the first flat mirror 12.

After that, the laser beam comes incident on the first curved mirror 8, is reflected by the first curved mirror 8, and thereafter circulates in the resonator 4 by the route hitherto described.

When the laser beam passes the barium borate crystal 6, the barium borate crystal 6 generates the secondary harmonic of the original green laser beam of 532 nm in wavelength, i.e. an ultraviolet laser beam of 266 nm in wavelength, which is emitted from the resonator 4 via the second curved mirror 10.

Since the laser beam passing the barium borate crystal 6 is squeezed into a thin beam, as described above, to facilitate the generation of the secondary harmonic by the barium borate crystal 6, the laser beam is appropriately squeezed by the first and second curved mirrors 8 and 10.

In this preferred embodiment, however, with a view to forestalling the adverse effect of squeezing the laser beam excessively, the waist of the laser beam (the radius of the beam cross section) in the position of the barium borate crystal 6 is set to a proper value by adjusting the distance between the first curved mirror 8 and the first flat mirror 12.

Figure 4:
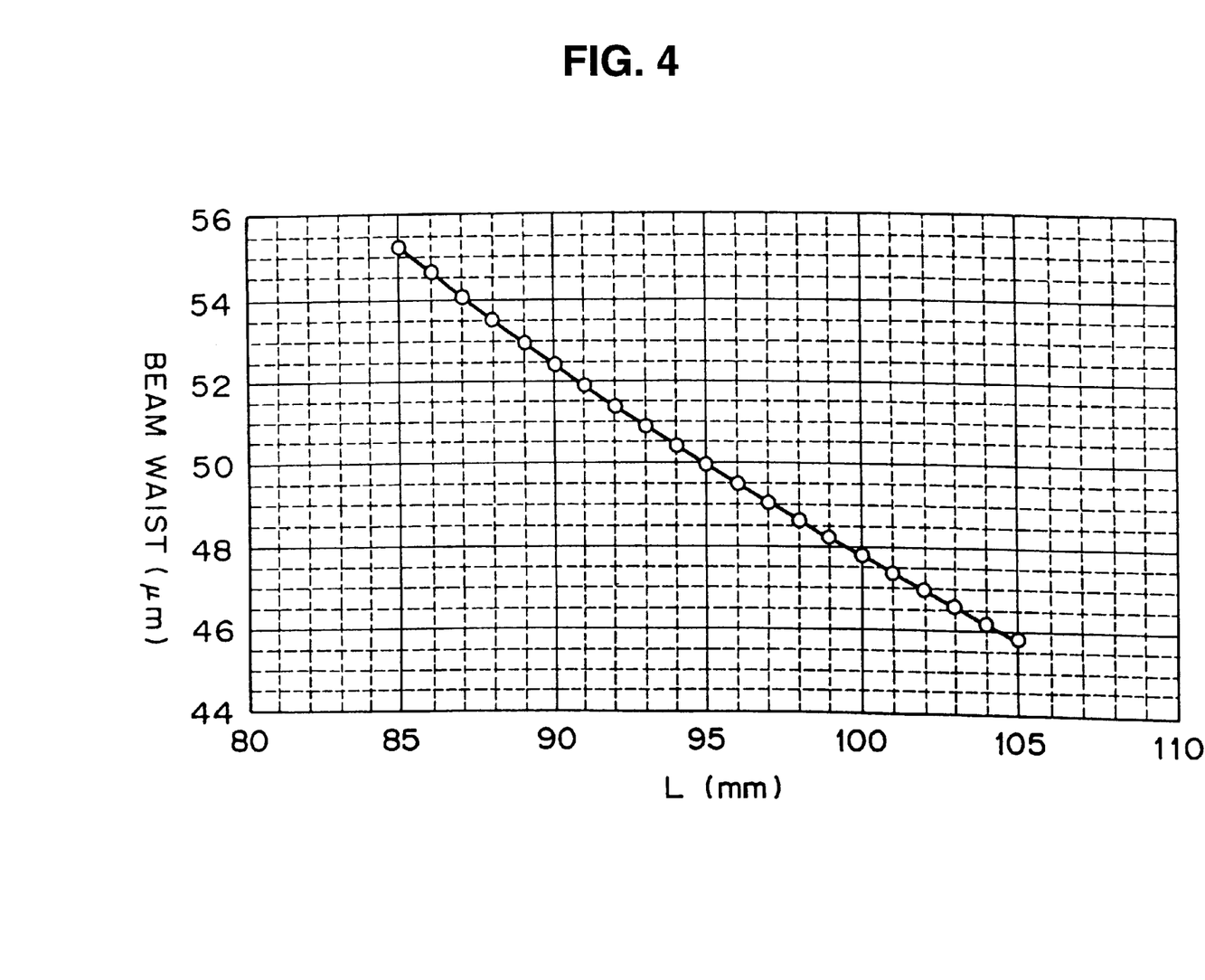
FIG. 4 is a graph representing the relationship between the distance L between a first curved mirror and a first flat mirror and the beam waist in the position of the barium borate crystal.

FIG. 4 is a graph representing the relationship between the distance L between the first curved mirror 8 and the first flat mirror 12 (therefore the distance between the second curved mirror 10 and the second flat mirror 14) and the beam waist in the position of the barium borate crystal 6, wherein the calculated values of the beam waist along with the variation of said distance L are plotted.

As is seen from this graph, the beam waist gradually narrows with an increase in the distance L and, as the distance L is varied from 85 mm to 105 mm, the beam waist varies from about 55 $\mu$m to about 56 $\mu$m.

In this laser beam generating apparatus 2 embodying the invention, the beam waist is set to 46 $\mu$m, about double the conventional thickness, by adjusting the distance L. As a result, the power density of the laser beam in the barium borate crystal 6 has been reduced to ¼ of the value according to the related art, and it is made possible to avoid rapid damaging of the barium borate crystal 6 by excessive squeezing of the laser beam.

Figure 5:
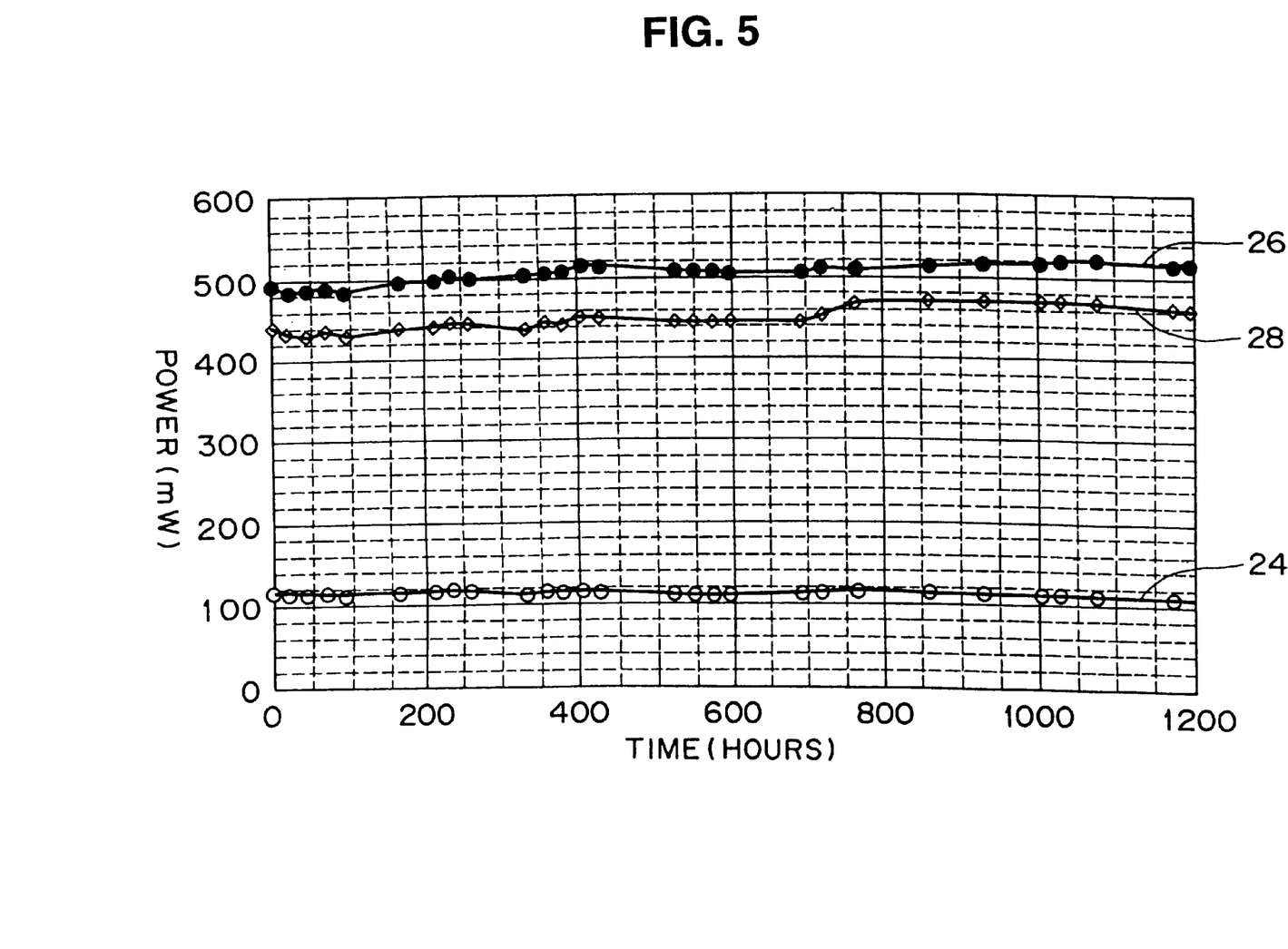
FIG. 5 is a graph showing the service life of a resonator actually determined.

FIG. 5 is a graph showing the service life of the laser beam generating apparatus actually determined. In the graph, the horizontal axis represents time, and the vertical axis, the power (in mW) of the laser beam.

Herein, a polygonal line 24 represents the power of the ultraviolet laser beam emitted from the resonator 4; a polygonal line 26, the power of the laser beam generated by the laser oscillator 3; and a polygonal line 28, the power of the laser beam transmitted by the first curved mirror 8 and coming incident into the resonator 4.

In experimentation, said power levels were measured while adjusting the power of the laser beam generated by the laser oscillator 3 so as to keep the power of the ultraviolet laser beam constantly at 100 mW.

Accordingly, while the power of the laser beam to be supplied to the resonator 4 must steadily increase with the progress of damage to the barium borate crystal 6, the power of the laser beam supplied from the laser oscillator 3 to the resonator 4 scarcely increased, as is seen from the graph of FIG. 5, even when the laser beam generating apparatus 2 was operated for as long as 1200 hours. That is to say, a long service life of 1200 hours has been realized.

The rate of degradation is $6.9 \times 10^{-5}$ [%/hour] according to the result of this experiment, representing a significant improvement over the conventional level of $1.35 \times 10^{-4}$ [%/hour].

The ultimate service life of the apparatus can be estimated at approximately 5000 hours from this rate of degradation.

Microscopic observation of the barium borate crystal 6 revealed no trace of the beam pattern illustrated in FIG. 1.

An experiment, in which the length of the barium borate crystal 6 and the beam waste of the laser beam passing the barium borate crystal 6 were varied in many different ways, high power laser beams of 100 mW or more were obtained for a long period of no less than 1000 hours if the beam waist of the laser beam passing the barium borate crystal 6 was set in a range of 40 $\mu$m to 60 $\mu$m, where the length of the barium borate crystal 6 along the optical path was between 2 mm and 6 mm.

In a similar experiment, it was confirmed that, where the length of the barium borate 6 along the optical path was longer than 6 mm, high power laser beams of 100 MW or more could be obtained for a long period of no less than 1000 hours if the beam waist of the laser beam passing the barium borate crystal 6 was set wider than 60 $\mu$m.

An optical system for irradiation with an ultraviolet beam according to the invention is an optical system in which optical components are irradiated with an ultraviolet beam of not more than 400 nm in wavelength, and 99.9% or more of the ambiance of the optical components is nitrogen, or 99.9% or more of the ambiance of the optical components is air, or the ambiance of the optical components is a gas whose moisture content is not more than 0.1%, or is a gas whose hydrocarbon compound content is not more than 0.1%, or the ambiance of optical component is a gas whose moisture content and hydrocarbon compound content is not more than 0.1% and an oxygen content of 1% or more.

In this case, means to seal in the optical components with any of said ambient gases, i.e. one with a nitrogen content of 99.9% or more, one with an air content of 99.9% or more, one whose moisture content is not more than 0.1%, or one whose hydrocarbon compound content is not more than 0.1%, or one whose moisture content and hydrocarbon compound content is not more than 0.1% and with an oxygen content of 1% or more can be used to place the optical components in any of said ambiances.

Or else, means to purge the peripheries of the optical components with any of said ambient gases can be used as well. Purging, for example, can be accomplished by boring two or more holes in a sealed container, through one of which any of the above-mentioned ambient gases, i.e. one with a nitrogen content of 99.9% or more, one with an air content of 99.9% or more, one whose moisture content is not more than 0.1%, or one whose hydrocarbon compound content is not more than 0.1%, or one whose moisture content and hydrocarbon compound content is not more than 0.1% and with an oxygen content of 1% or more is blown in and through the other of which the gas originally present in the sealed container is expelled to replace the latter with the ambient gas blown in.

Also, an optical system for irradiation with an ultraviolet beam according to the invention may as well be an optical system in which, where an ultraviolet beam of not more than 400 nm in wavelength is to be generated by wavelength conversion with a nonlinear optical crystal disposed in an external resonator, its mirror section and nonlinear optical crystal section are placed in an ambiance with a nitrogen content of 99.9% or more, or with an air content of 99.9% or more, or in a gas whose moisture content is not more than 0.1%, or a gas whose hydrocarbon compound content is not more than 0.1%. In this case, means to seal in said mirror section and nonlinear optical crystal section with any of said ambient gases, i.e. one with a nitrogen content of 99.9% or more, one with an air content of 99.9% or more, one whose moisture content is not more than 0.1% or one whose hydrocarbon compound content is not more than 0.1%, or one whose moisture content and hydrocarbon compound content is not more than 0.1% and with an oxygen content of 1% or more can be used to place these sections in any of said ambiances.

Or, means to purge said sections with any of said ambient gases can be used as well. Purging, for example, can be accomplished by boring two or more holes in a sealed container in which to arrange these sections, through one of which any of the above-mentioned ambient gases, i.e. one with a nitrogen content of 99.9% or more, one with an air content of 99.9% or more, one whose moisture content is not more than 0.1%, or one whose hydrocarbon compound content is not more than 0.1%, or one whose moisture content and hydrocarbon compound content is not more than 0.1% and with an oxygen content of 1% or more is blown in and through the other of which the gas originally present in the sealed container is expelled to replace the latter with the ambient gas blown in.

Specific preferred embodiments of the present invention will be described below.

EMBODIMENT 1

This embodiment represents an application of the invention to an optical system for ultraviolet beam generation having an external resonator section, described with reference to FIG. 2, i.e. a wavelength converting system wherein a nonlinear optical crystal is disposed in an external resonator.

This embodiment is an optical system in which, where an ultraviolet beam of not more than 400 nm in wavelength is to be generated by wavelength conversion with a nonlinear optical crystal disposed in an external resonator illustrated in FIG. 2, its mirror section and nonlinear optical crystal section are placed in an ambiance with a nitrogen content of 99.999% or more. The high reflection mirrors 10, 12 and 14, the incidence mirror 8, and the nonlinear optical crystal (BBO) 6 in FIG. 2 are placed in this ambiance with a nitrogen content of 99.999% or more. More specifically, the inside of the external resonator shown in FIG. 2 was purged with nitrogen of 99.999% in purity, and wavelength conversion was carried out in a way similar to the above-described.

Figure 6:
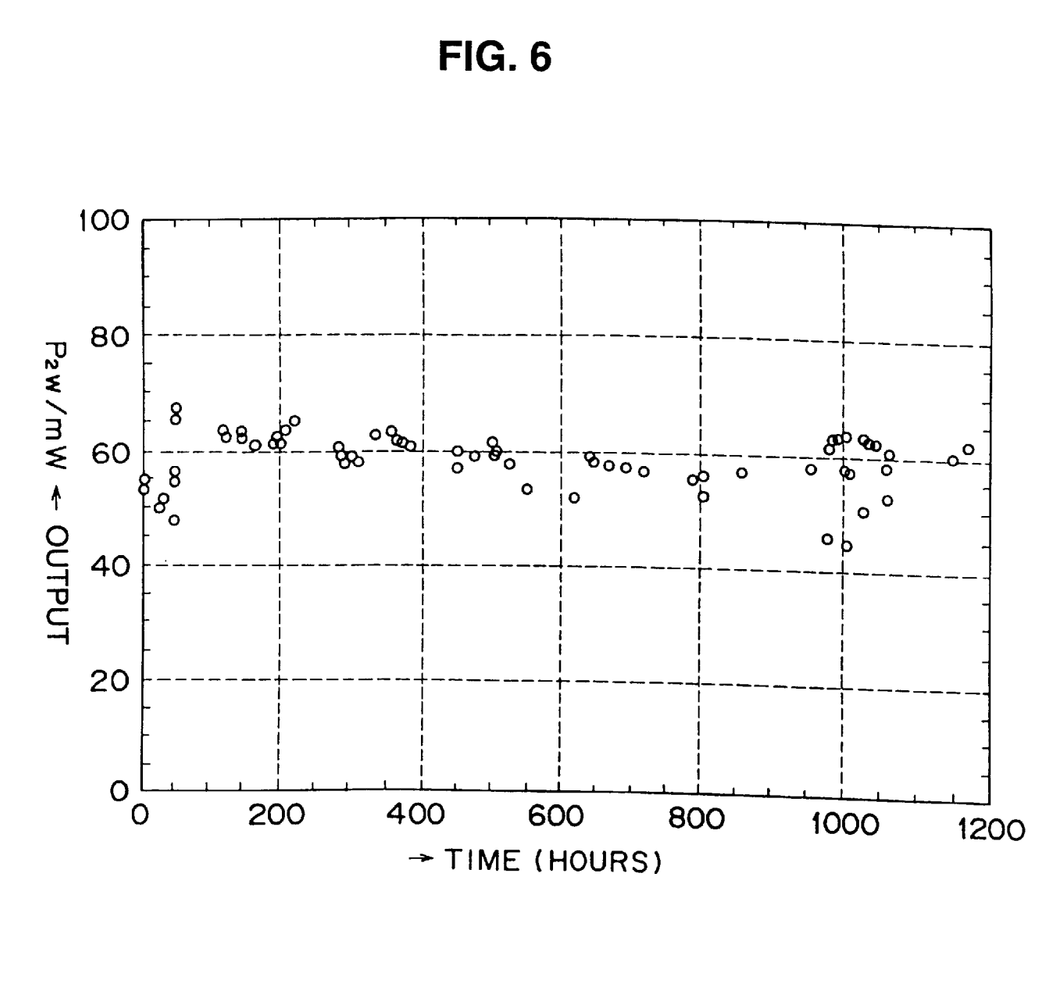
FIG. 6 is a diagram illustrating the action of a first preferred embodiment of the invention.

As a result, the optical losses of the mirrors did not increase, and the power of the secondary harmonic remained without drop for 1000 hours or more, as shown in FIG. 6. FIG. 6, in which the horizontal axis represents time (in hours) and the vertical axis, the power ($P_2\omega$/MW) I shows how the power of the secondary harmonic behaves over time. As is seen from FIG. 6, the output of the secondary harmonic remained free from attenuation for 1000 hours or more.

Figure 7:
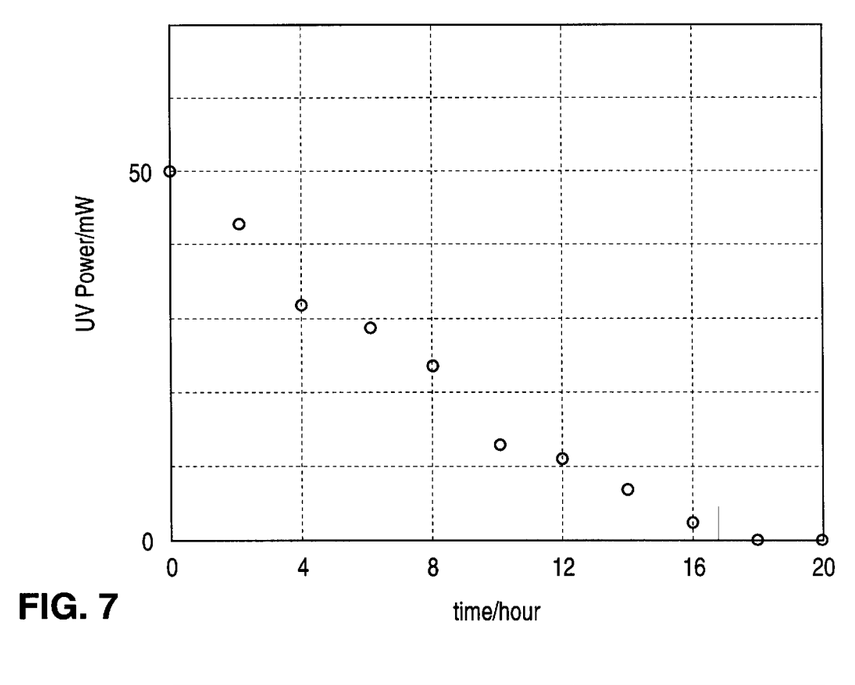
FIG. 7 is a graph showing problem of usual technology.

When wavelength conversion as described above was accomplished, byway of comparison, under the same conditions as the above-described except that the inside of the external resonator was in natural atmosphere, the optical losses of the mirror increased and the output of the secondary harmonic dropped, as shown in FIG. 7. Data in FIG. 7 are smoothed by averaging. FIG. 7, in which the horizontal axis represents time (in hour) and the vertical axis, the ultraviolet power (in mW), shows how the power of the second harmonic behaves over time. As is seen from FIG. 7, the output of the second harmonic drops into 0 mW approximately 20 hours after.

EMBODIMENT 2

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in an external resonator. Herein, the inside of the external resonator shown in FIG. 2 was purged with air of 99.999% in purity, and wavelength conversion was carried out in a way similar to the above-described.

As a result, a similar effect to that of Embodiment 1 was achieved. Especially, UV power becomes stable, when 1% or more of the ambiance of optical component is oxygen.

EMBODIMENT 3

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in an external resonator. Herein, the inside of the external resonator shown in FIG. 2 was purged with a gas with a moisture content of 0.001%, and wavelength conversion was carried out in a way similar to the above-described.

As a result, a similar effect to that of Embodiment 1 was achieved.

EMBODIMENT 4

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in an external resonator, wherein the inside of the external resonator shown in FIG. 2 was purged with a gas with a hydrocarbon content of 0.001%, and wavelength conversion was carried out in a way similar to the above-described.

As a result, a similar effect to that of Embodiment 1 was achieved.

EMBODIMENT 5

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in a external resonator. Herein, the inside of the external resonator shown in FIG.2 was purged with nitrogen of 99.9% in purity, and wavelength conversion was carried out in a way similar to the above described.

Figure 8:
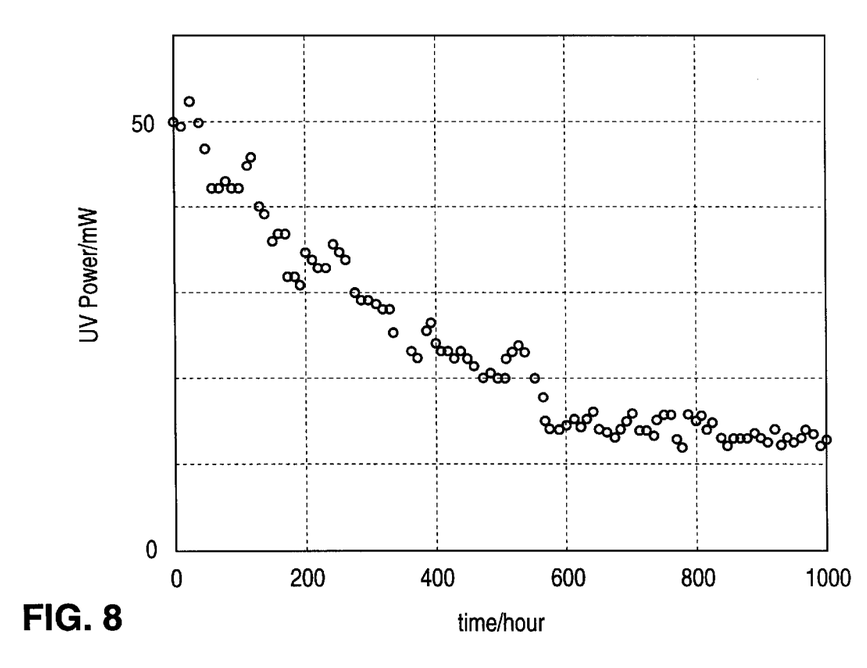
FIG. 8 is a graph showing one embodiment of the invention.

As a result, power of the second harmonic as obtained for 1000 hours or more, although it slightly dropped, as shown in FIG. 8. FIG. 8 in which the horizontal axis represents time (in hour) and the vertical axis, the ultraviolet power (in mW), shows how the power of the second harmonic behaves over time. Data in FIG. 8 are smoothed by averaging. As :is seen from FIG. 8, the output of the second harmonic was obtained for 1000 hours or more, although it was obtained only for 20 hours or so with the external resonator in natural atmosphere.

Figure 9:
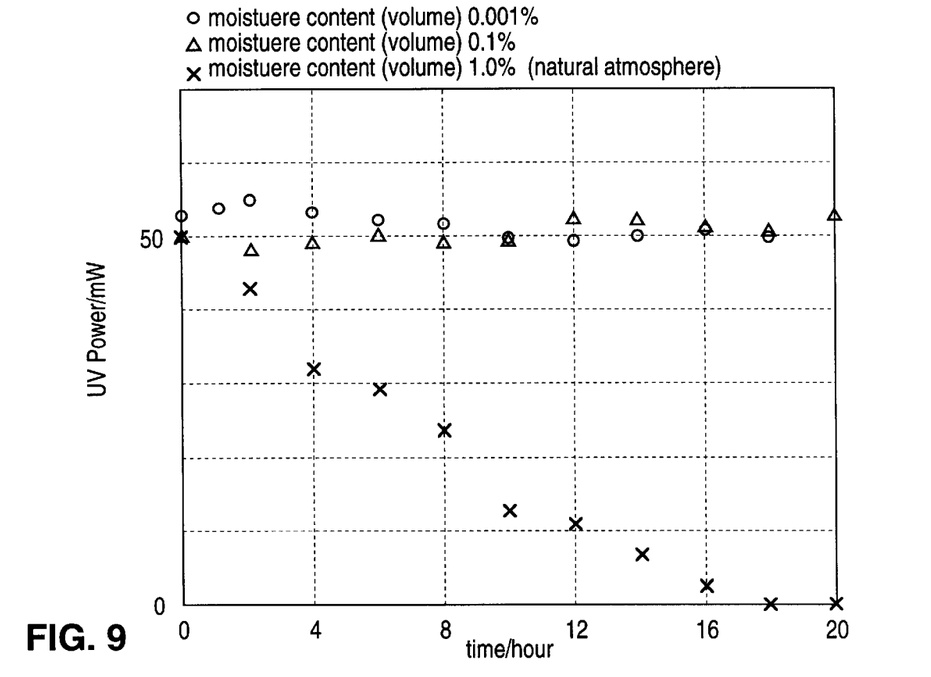
FIG. 9 shows plots of UV Power versus time for several moisture contents of the ambiance around the optics of the laser of the invention over an operating period of 20 hours.

FIG. 9 shows plots of UV Power versus time for several moisture contents of the ambiance around the optics of the laser of the invention over an operating period of 20 hours. A comparison of the plots shown in FIG. 9 illustrate how an ambient moisture content of 0.1% is very advantageous over a moisture content of 1.0%. For example, a laser outputting 50 mW at time 0 outputs. 0 mW at 20 hours in an ambient having a moisture content of 1.0%, whereas the same laser outputs substantially 50 mW at 20 hours in an ambient having a moisture content of 0.1%.

Figure 10:
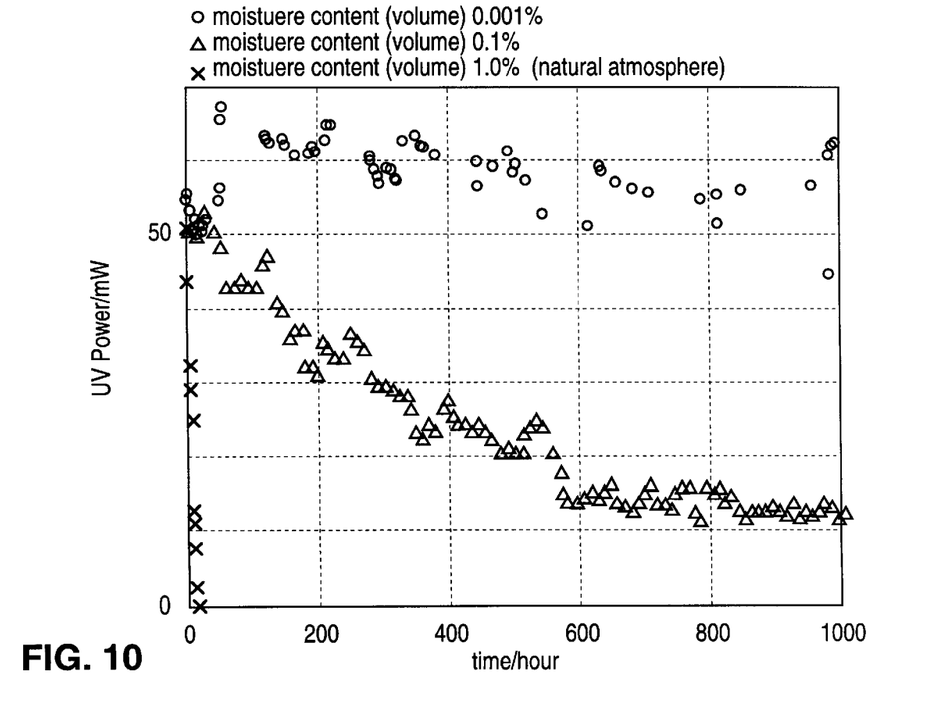
FIG. 10 shows plots of UV Power versus time for several moisture contents of the ambiance around the optics of the laser of the invention over an operating period of 1000 hours.

FIG. 10 shows plots of UV Power versus time for several moisture contents of the ambiance around the optics of the laser of the invention over an operating period of 1000 hours. A comparison of the plots shown in FIG. 10 illustrate how an ambient moisture content of 0.1% is very advantageous over a moisture content of 1.0%, and how a moisture content of 0.001 is advantageous over either of a moisture content of 1.0% or 0.1%. For example, a laser outputting 50 mW at time 0 outputs 0 mW at 1000 hours in an ambient having a moisture content of 1.0%, and the same laser outputs around 12 mW at 1000 hours in an ambient having a moisture content of 0.1%, whereas the same laser outputs substantially 50 mW at 1000 hours in an ambient having a moisture content of 0.001%.

EMBODIMENT 6

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in a external resonator. Herein, the inside of the external resonator shown in FIG. 2 was purged with air of 99.9% in purity, and wavelength conversion was carried out in a way similar to the above described.

As a result, a similar effect to that of Embodiment 5 war, achieved.

EMBODIMENT 7

This embodiment, like Embodiment 1, represents an application of the invention to an optical system for ultraviolet beam generation having an external resonator section, described with reference to FIG. 2, i.e. a wavelength converting system wherein a nonlinear optical crystal is disposed in a external resonator. Herein, the inside of the external resonator shown in FIG. 2 was purged with a gas with a moisture content of 0.1%, and wavelength conversion was carried out in a way similar to the above described.

As a result, a similar effect to that of Embodiment 5 was achieved.

EMBODIMENT 8

Embodiment 8, like Embodiment 1, represents an application of the invention to an optical system for ultraviolet beam generation having an external resonator section, described with reference to FIG. 2, i.e. a wavelength converting system wherein a nonlinear optical crystal is disposed in a external resonator. Herein, the inside of the external resonator shown in FIG. 2 was purged with a gas with a hydrocarbon content of 0.1%, and wavelength conversion was carried out in a way similar to the above described.

As a result, a similar effect to that of Embodiment 6 was achieved.

EMBODIMENTS 9 to 16

Whereas the external resonator sections of these embodiments had respectively the same ambiances as those of Embodiments 1 to 8, those of Embodiments 9 to 16 were sealed in from the outset with the respective ambient gases instead of purging them with the respective ambient gases as in Embodiments 1 to 8.

EMBODIMENTS 17 to 24

These embodiments are optical systems in which optical components are irradiated with an ultraviolet beam of not more than 400 nm in wavelength, wherein the peripheries of the optical components are surrounded by the respectively similar ambiances to those in Embodiments 1 to 8.

EMBODIMENTS 25 to 32

These embodiments are optical systems in which optical components are irradiated with an ultraviolet beam of not more than 400 nm in wavelength, wherein the peripheries of the optical components are surrounded by the respectively similar ambiances to those in Embodiments 9 to 16.

What is claimed is:

1. A laser beam generating apparatus, wherein an ultraviolet beam of not more than 400 nm in wavelength is generated by wavelength conversion with a nonlinear optical crystal disposed in an external resonator, and wherein 99.9% or more of the ambiance of its mirror section and nonlinear optical crystal section is nitrogen.

2. A laser beam generating apparatus, wherein an ultraviolet beam of not more than 400 nm in wavelength is generated by wavelength conversion with a nonlinear optical crystal disposed in an external resonator, and wherein the ambiance of its mirror section and nonlinear optical crystal section is a gas whose moisture content is not more than 0.1%.

3. A laser beam generating apparatus, wherein an ultraviolet beam of not more than 400 nm in wavelength is generated by wavelength conversion with a nonlinear optical crystal disposed in an external resonator, and wherein the ambiance of its mirror section and nonlinear optical crystal section is a gas whose hydrocarbon content is not more than 0.1%.

4. A laser beam generating apparatus, wherein an ultraviolet beam of not more than 400 nm in wavelength is generated by wavelength conversion with nonlinear optical crystal disposed in an external resonator, and wherein the ambiance of its mirror section and nonlinear optical crystal section is a gas whose moisture content and hydrocarbon compound content is not more than 0.1% and with an oxygen content of 1% or more.

* * * * *

UNITED STATES PATENT AND TRADEMARK OFFICE
CERTIFICATE OF CORRECTION

PATENT NO. : 6,404,786 B1  Page 1 of 1
DATED : June 11, 2002
INVENTOR(S) : Kenji Kondo et al.

It is certified that error appears in the above-identified patent and that said Letters Patent is hereby corrected as shown below:

Title page,
Item [57], ABSTRACT,
Line 2, change "at a" to -- at a, --.

Column 1,
Line 63, delete "FIG.".

Column 2,
Line 21, change "AppI." to -- Appl. --.
Line 53, change "wave-Length" to -- wavelength --.
Line 56, change "at a," to -- at a --.
Line 60, change "nm.," to -- nm. --.

Column 5,
Line 35, delete ":" after "wavelength".

Column 6,
Line 58, change "along," to -- along --.

Column 11,
Line 31, change ": is" to -- is --.
Line 42, change "outputs." to -- outputs --.
Line 52, change "0.001" to -- 0.001% --.

Column 12,
Line 5, change "war," to -- was --.

Signed and Sealed this

Eleventh Day of March, 2003

JAMES E. ROGAN
*Director of the United States Patent and Trademark Office*